United States Patent
Wu et al.

(10) Patent No.: US 9,015,140 B2
(45) Date of Patent: Apr. 21, 2015

(54) SYSTEM AND METHOD FOR PROVIDING CONTEXTUAL ACTIONS ON A SEARCH RESULTS PAGE

(75) Inventors: Su-Lin Wu, San Carlos, CA (US); Andrei Broder, Menlo Park, CA (US); Evgeniy Gabrilovich, Sunnyvale, CA (US); Ronny Lempel, Zichron Yaakov (IL); Edward Bortnikov, Haifa (IL); Peter Mika, Barcelona (ES); Debora Donato, San Francisco, CA (US); Wei-Cheng Lai, Cupertino, CA (US); Christopher LuVogt, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 294 days.

(21) Appl. No.: 12/981,860

(22) Filed: Dec. 30, 2010

(65) Prior Publication Data

US 2012/0173520 A1    Jul. 5, 2012

(51) Int. Cl.
    *G06F 17/30* (2006.01)
(52) U.S. Cl.
    CPC ............................... *G06F 17/30867* (2013.01)
(58) Field of Classification Search
    None
    See application file for complete search history.

(56) References Cited

U.S. PATENT DOCUMENTS

| | | | |
|---|---|---|---|
| 6,269,361 B1* | 7/2001 | Davis et al. ............................ 1/1 |
| 7,966,309 B2* | 6/2011 | Shacham et al. ............... 707/708 |
| 8,018,607 B2* | 9/2011 | Nuttall et al. ................ 358/1.14 |
| 8,086,591 B2* | 12/2011 | Scott et al. .................... 707/708 |
| 2004/0210567 A1* | 10/2004 | Bourdoncle ....................... 707/3 |
| 2007/0078822 A1* | 4/2007 | Cucerzan et al. .................. 707/3 |
| 2007/0209013 A1* | 9/2007 | Ramsey et al. ................ 715/769 |
| 2008/0201311 A1* | 8/2008 | Ertugrul et al. .................... 707/4 |
| 2008/0295006 A1* | 11/2008 | LuVogt et al. ................. 715/764 |
| 2008/0301643 A1* | 12/2008 | Appleton et al. .............. 717/124 |
| 2009/0235149 A1* | 9/2009 | Frohwein ....................... 715/205 |
| 2010/0036830 A1* | 2/2010 | Lee ................................... 707/5 |
| 2010/0198628 A1* | 8/2010 | Rayner .............................. 705/6 |
| 2010/0198825 A1* | 8/2010 | Chan et al. .................... 707/736 |
| 2010/0281393 A1* | 11/2010 | Fujioka ......................... 715/745 |

(Continued)

FOREIGN PATENT DOCUMENTS

CN         1378674 A      11/2002
WO     2010138749 A1      12/2010

OTHER PUBLICATIONS

Kraft et al. Y!Q: Contextual Search at the Point of Inspiration, published 2005 ACM.*
Office Action issued on Apr. 29, 2014 in Korean Application No. 10-2013-7017062.

(Continued)

*Primary Examiner* — Kevin L Young
(74) *Attorney, Agent, or Firm* — Pillsbury Winthrop Shaw Pittman LLP (57) ABSTRACT

The present invention provides a method and system for providing targeted applications within a search engine results page. The method and system includes receiving a search query from a user and interpreting the search query. The method and system then first maps the interpreted query to one or more action templates, wherein mapping the interpreted query to one or more action templates comprises selecting one or more actions associated with the interpreted query. The method and system then maps the selected one or more actions associated with the interpreted query to a plurality of applications and selecting one or more applications associated with the one or more actions. Finally, the method and system displays the one or more applications within a search results page.

16 Claims, 6 Drawing Sheets

(56) References Cited

U.S. PATENT DOCUMENTS

2012/0059732 A1* 3/2012 Dakka et al. ............... 705/26.4
2012/0130969 A1* 5/2012 Wong et al. ................ 707/706

OTHER PUBLICATIONS

Office Action issued on Apr. 10, 2014 in Taiwanese Application No. 100148240.

* cited by examiner

SYSTEM AND METHOD FOR PROVIDING CONTEXTUAL ACTIONS ON A SEARCH RESULTS PAGE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention described herein generally relates to providing targeted, contextual applications in response to a search query. More specifically, the invention is directed towards systems and methods for parsing a user query, identifying user context, associating actions based on the user query and context with saved applications, and presenting an application or application(s) on a user device.

BACKGROUND OF THE INVENTION

As the Internet continues to expand exponentially, the role of search engines has dramatically increased. The sheer volume of Internet content has quickly become impossible for a human user to utilize manually. Thus, the use of search engine technology has become a vital tool in the increasing the usefulness of the Internet.

While great strides have been made in increasing the relevancy of search results, little advancement have taken into consideration the context and historical data of a search engine user. Additionally, very little advancement has been made that incorporate applications or widgets within the search results page interface. In contrast, current search engines generally provide a simple list of hyperlinks in response to a user query. As such, a user is required to identify and select the link that is most relevant to his or her query. Furthermore, a user may have to take additional steps to procure the results he or she is seeking.

A particularly poignant example is that of a user looking to plan a vacation. In the current environment, a user may enter a query such as "flights from boston to los angeles." In response, the user may receive a plurality of sites that relate to purchasing tickets. This paradigm is detrimental for multiple reasons. First, a user still has to navigate through a myriad of search results, many of which may not be the desired website. Secondly, current search engines will only present information relating to instant search query. That is, in the current state of the art, users planning a vacation from Boston to Los Angeles would have to perform multiple searches (on top of the "flights from boston to los angeles" search) to book a hotel, rent a car, find a restaurant, and perform other tourist activities.

Thus, the current state of the art fails to consider the "big picture" of user search behavior. Namely, current search engine techniques simply respond to the user's query directly and do not attempt to ascertain the nature of the query by using a user's context and historical search history. Thus, there exists a need in the current state of the art to enhance the user search experience by providing contextual applications that are provided in response to an anticipated user goal.

SUMMARY OF THE INVENTION

The present invention is directed towards systems and methods for providing targeted applications within a search engine results page. The method receives a search query from a user and interprets the search query. In one embodiment, interpreting the user search query comprises generating a tokenized form of the search query. In an alternative embodiment, interpreting the user search query further comprises adding data representing a user context to the search query wherein user context comprises data stored in a user profile. In an alternative embodiment interpreting the user search query further comprises adding data representing a user context to the search query wherein user context comprises historical search queries of the user. The method then first maps the interpreted query to one or more action templates, wherein mapping the interpreted query to one or more action templates comprises selecting one or more actions associated with the interpreted query.

The method then maps the selected one or more actions associated with the interpreted query to a plurality of applications and selecting one or more applications associated with the one or more actions. In one embodiment, mapping the selected one or more actions associated with the interpreted query to a plurality of applications comprises using editorial judgments. In an alternative embodiment, wherein mapping the selected one or more actions associated with the interpreted query to a plurality of applications is performed algorithmically. In an alternative embodiment, mapping the selected one or more actions associated with the interpreted query to a plurality of applications and selecting one or more applications associated with the one or more actions further comprises pre-filling the applications based on data extracted from the search query and user context and search history.

In one embodiment, the method ranks the one or more selected applications. In one embodiment, ranking the one or more selected applications comprises selecting the top applications based on the applications' popularity among a community of users. In an alternative embodiment, ranking the one or more selected applications comprises selecting the top applications based on the applications' historic revenue. Finally, the method displays the one or more applications within a search results page.

The present invention is further directed to a system for providing targeted applications within a search engine results page. The system comprises a plurality of client device coupled to a search engine through a network, the client devices over to transmit search queries to the search engine. The system further comprises a query interpreter operative to interpret the search query. In one embodiment, the query interpreter is further operative to generate a tokenized form of the search query. In an alternative embodiment, the query interpreter is further operative to add data representing a user context to the search query. In one embodiment, user context comprises data stored in a user profile. In an alternative embodiment, user context comprises historical search queries of the user. The system further comprises an action inference module operative to map the interpreted query to one or more action templates, wherein mapping the interpreted query to one or more action templates comprises selecting one or more actions associated with the interpreted query.

The system further comprises an application scorer operative to map the selected one or more actions associated with the interpreted query to a plurality of applications and selecting one or more applications stored in an application database and associated with the one or more actions. In one embodiment, mapping the selected one or more actions associated with the interpreted query to a plurality of applications comprises using editorial judgments. In another embodiment, mapping the selected one or more actions associated with the interpreted query to a plurality of applications is performed algorithmically. In another embodiment, the application scorer is further operative to rank the one or more selected applications.

In further embodiments, the application scorer is further operative to rank the one or more selected applications. In one embodiment, ranking the one or more selected applications comprises selecting the top applications based on the applications' popularity among a community of users. In an alternative embodiment, ranking the one or more selected applications comprises selecting the top applications based on the applications' historic revenue. The system additionally comprises a front-end server operative to display the one or more applications within a search results page.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
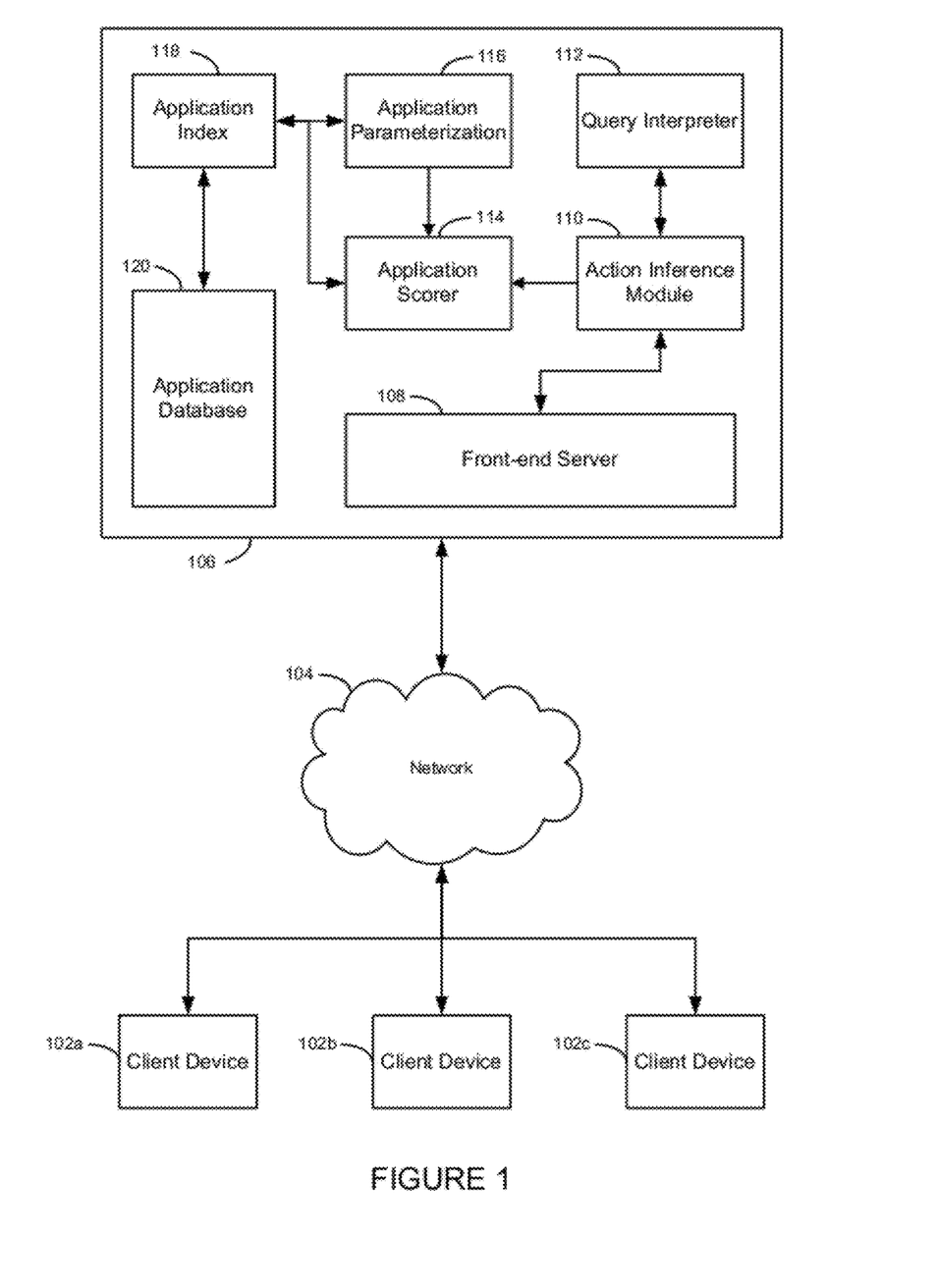
FIG. 1 presents a block diagram depicting a system for generating contextual actions based on user context according to one embodiment of the present invention.

FIG. 1 presents a block diagram depicting a system for generating contextual actions based on user context according to one embodiment of the present invention. As the embodiment of FIG. 1 illustrates, a plurality of client devices 102a, 102b, 102c are connected to a search engine 106 through network 104. The search engine 106 comprises a plurality of components including a front-end server 108, action inference module 110, query interpreter 112, application scorer 114, application parameterization module 116, application index 118, and application database 120.

Client devices 102a, 102b, and 102c may be general purpose computing devices (e.g., personal computers, television set top boxes, mobile devices, etc.) having a central processing unit, memory unit, permanent storage, audio/video output devices, network interfaces, etc. Client devices 102a, 102b, and 102c are operative to communicate via network 104, which may be a local or wide area network such as the Internet. In the present embodiment, client devices 102a, 102b, and 102c transmit requests to search engine 106 via the HTTP, WAP or similar protocol for the client/server exchange of text, images and other data.

Client devices 102a, 102b, and 102c are operative to transmit requests for search results to search provider 110, the search requests including search terms. The terms may be user generated search terms or can be user-assisted, i.e. suggested, search terms. In one embodiment, client devices 102a, 102b, and 102c may be operative to transmit an HTTP request containing a textual query string. For example, a user operating a client device 102a, 102b, and 102c may enter a query string with search terms such as "sushi in new york, ny" and submit the query via an HTML form element.

Search engine 106 receives queries from the client devices via front-end server 108. In one embodiment, front-end server 108 may comprise various hardware components running web server software such as APACHE HTTP SERVER, MICROSOFT IIS, or any other suitable web server software. In the illustrated embodiment, front-end server 108 receives the search requests entered by a given user. The front-end server 108 may first retrieve a plurality of search results responsive to the given query from a search index (not shown). In one embodiment, a plurality of search results comprises a plurality of webpages that at least include one or more of the submitted search terms. In the illustrate embodiment, various methods known in the art may be used to identify a plurality of search results within a search index. Front-end server 108 is further operative to transmit search results and applications to a client device 102a, 102b, and 102c.

Front-end server 108 communicates with action inference module 110. In the illustrated embodiment, front-end server 108 transmits the received query to the action inference module 110. In alternative embodiments, front-end server 108 additionally transmits metadata regarding the query to the action inference module 110. For example, front-end server 108 may transmit information in a cookie associated with the querying user containing data such as a user ID. In the illustrated embodiment, the action inference module 110 indexes actions for faster retrieval, stores metadata for retrieving and weighting actions, and selects actions based on context.

Upon receiving a query, the query interpreter 112 analyzes a given query and provides an interpretation of the query that represents a user's context. For example, query interpreter 112 may receive a query "flight bos to lax". In response, query interpreter 112 is operative to translate the plain text query into a structured format such as "<token:flight><city:boston><token:to><city:los angeles>". As illustrated, the query interpreter 112 converts the plaintext query into a tokenized version based on properties of the received query. In the previous example, the query interpreter 112 extracts the terms "flight" and "to" as tokens and "bos" and "lax" as cities. In alternative embodiments, the query interpreter may utilize a plurality of external metrics in generating an interpretation. For example, query interpreter 112 may utilize a user profile (including long and short-term activity), matching concepts and entities or objects, and the original user query. Additionally, query interpreter 112 may utilize collected metrics relating to user interaction with the applications. In one embodiment, metrics represent the quality of the user experience with the application and quickly improve based on user behavior.

Query interpreter 112 returns the extracted context to action inference module 110. Based on the identified context, the action inference module 110 selects an action. In one embodiment, the action inference module 110 compares the interpreted context to a plurality of templates. For example, the action inference module 110 may match the above interpreted context with two templates actions "<Purchase plane tickets>" and "Check flight arrival/departure times>".

The action inference module 110 transmits the identified action and interpreted context to application scorer 114. In the illustrated embodiment, application scorer 114 selects applications from the application index 118 based on the received context and action. Additionally, application scorer 114 may score and rank the identified applications as will be discussed herein. In addition to the application scorer module 114, application parameterization module 116 is operative to extract relevant parameters from the interpreted context. For example, in the above example, the application parameterization module 116 may extract the terms "bos" and "lax" as the relevant parameters. In an alternative embodiment, the application parameterization module 116 may additionally convert "box" and "lax" to "Boston" and "Los Angeles" or perform other transformative operations. In addition to identifying parameters, the application parameterization module 116 may also pre-fill application fields with the identified parameters. In the given example, the application parameterization module 116 may insert the cities Boston and Los Angeles into an identified application such as an application providing arrival and departure times.

Action inference module 110 and application parameterization module 116 may access applications via an application index 118. Application index 118 indexes applications for faster retrieval. In the illustrated embodiment, application index 118 stores metadata for aiding in the fast retrieval and ranking of the applications. In addition to providing fast retrieval, application index 118 may additionally handle incoming additions to the application database 120. That is, application index 118 may receive new applications and data from developers and index the applications before storing the applications in the application database 120. The search engine 106 may additionally provide an API to allow developers to create and maintain applications stored within the application database 120.

Figure 2:
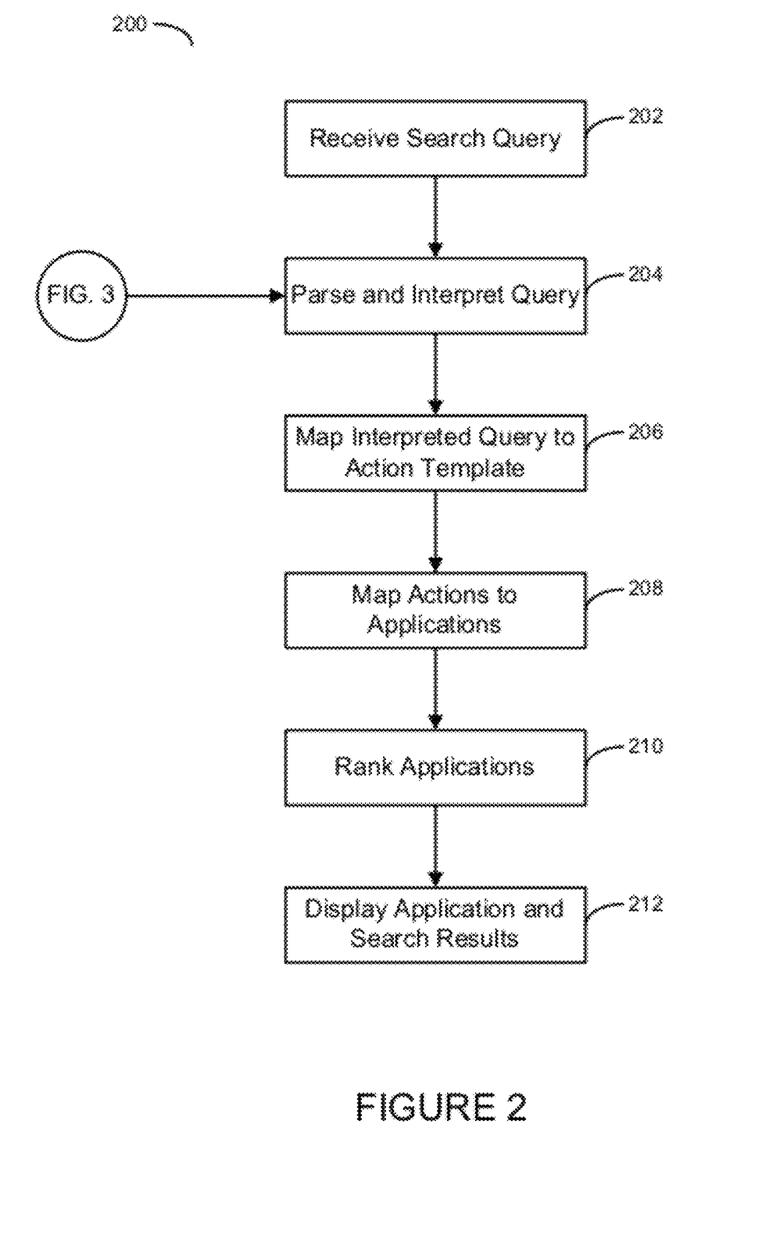
FIG. 2 presents a flow diagram depicting a system for generating contextual actions based on user queries according to one embodiment of the present invention.

FIG. 2 presents a flow diagram depicting a system for generating contextual actions based on user queries according to one embodiment of the present invention. In the illustrated embodiment, a method 200 first receives a search query, step 202. In the illustrated embodiment, the method 200 may receive the query via a search form such as an HTML form or other entry mechanism such as a browser toolbar. Expanding on the previous example, the method 200 may receive a query as a plaintext string such as "flight bos to lax."

After receiving the search query, the method 200 parses and interprets the query, step 204. In the illustrated embodiment, the method 200 converts the plaintext string into a tokenized form. For example, the method 200 may convert the plaintext string "flight box to lax" to the tokenized interpretation "<token:flight><city:boston><token:to><city:los angeles>". As can be seen, the method 200 translates "bos" to the token "<city:boston>" and "lax" to the token "<city:los angeles>". In one embodiment, the method 200 performs various text-processing operations to reformat the query in the event that various terms are misspelled, misplaced, etc.

The method 200 then maps the identified interpreted query to an action template, step 206. In the illustrated embodiment, the method 200 may identify a plurality of action templates that match the tokenized interpretation. For example, the method 200 may identify that the tokens "flight" and "to" indicate that a user is traveling between two locations. Based on this interpretation, the method 200 may identify a plurality of templates such as a "Purchase plane tickets" action and a "Check flight arrival/departure times" action. In one embodiment, each identified action is associated with a given weight. For example a "Purchase plane tickets" action may be given a higher weight than a "Check flight arrival/departure times" action. Determining the weight of actions may be based on historical user metrics (e.g., users more often are interested in purchasing tickets), revenue metrics (e.g., the amount of revenue generated per application), or a combination thereof.

The method 200 then maps the actions to a plurality of applications, step 208. For example, the method 200 may map the "Purchase plane tickets" to an ORBITZ application that allows the user to purchase plane tickets between the desired destinations; the method 200 may also map the "Check flight arrival/departure times" action to an airline schedule application such as one provided by FLIGHTSTATS, or a similar application developer. In one embodiment, the method 200 may additionally pre-fill the applications with data tokenized in step 204. For example, the method 200 may pre-fill the ORBITZ application with the departure city (Boston) and arrival city (Los Angeles). In one embodiment, action-to-application mappings are based on editorial judgments. In alternative embodiments, action-to-application mappings are based on algorithmic determinations.

The method 200 next ranks the identified applications, step 210. Ranking of applications may utilize various metrics such as the application's popularity based on the number of users that utilize the application after entering a particular type of query. For example, users entering a query in the form "flights CITY1 to CITY2" (where CITY1 represents the departure city and CITY2 represents the arrival city) may utilize the ORBITZ application more frequently than the FLIGHTSTATS application. Various user metric collection devices embedded within the application or application's container page may collect this data. Based on this data, the method 200 may determine that the ORBITZ application should be ranked higher than the FLIGHTSTATS application. In alternative embodiments, the method 200 may use other ranking such as ranking by the amount of advertising revenue the application has earned. Alternatively, or in conjunction with the foregoing, the method 200 may rank applications based on predetermined application quality, authoritativeness, or various other metadata parameters associated with the applications.

Figure 4:
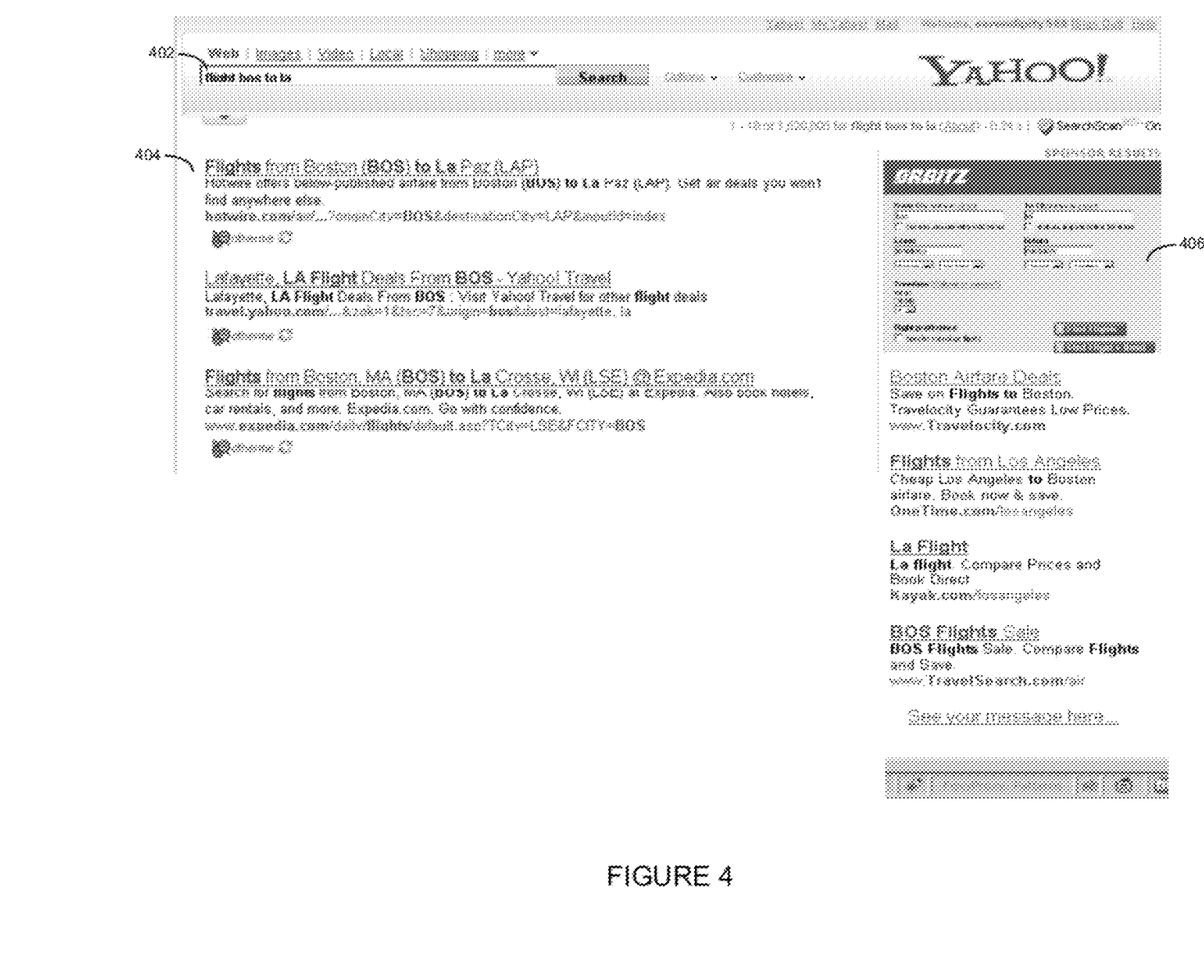
FIG. 4 presents a screen diagram illustrating contextual applications on a search results page according to one embodiment of the present invention.
Figure 5:
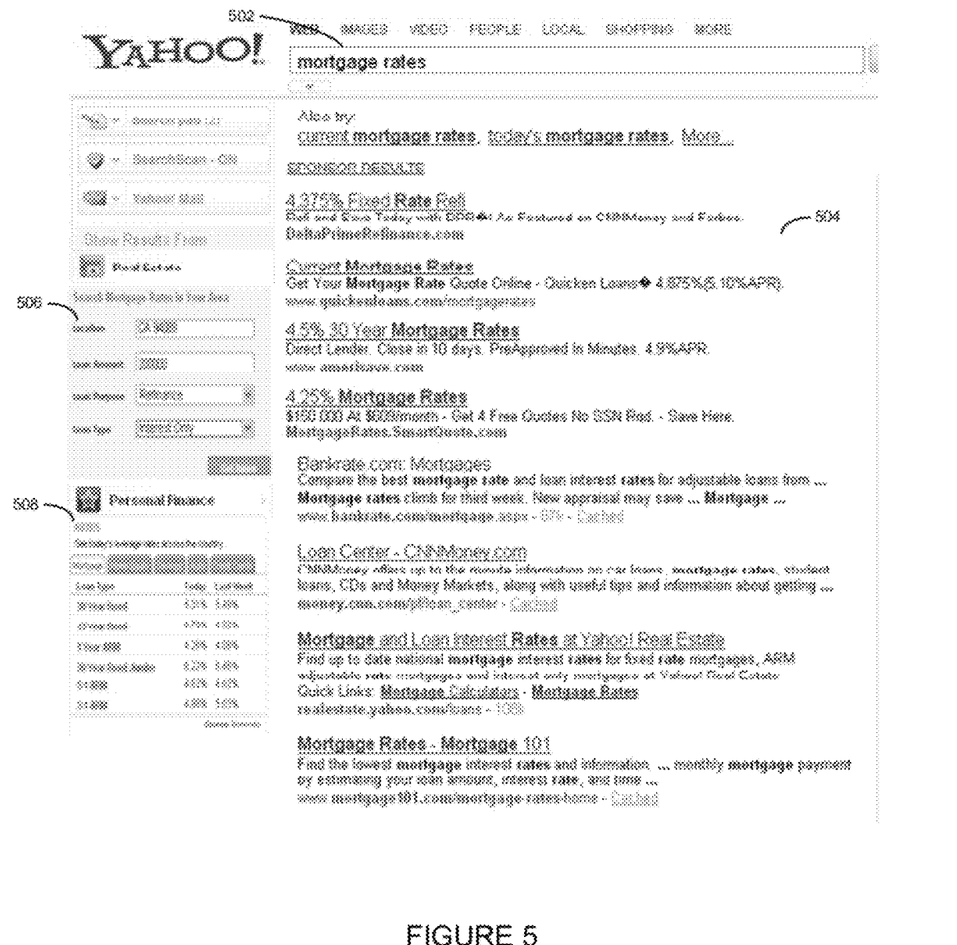
FIG. 5 presents a screen diagram illustrating contextual applications on a search results page according to one embodiment of the present invention.
Figure 6:
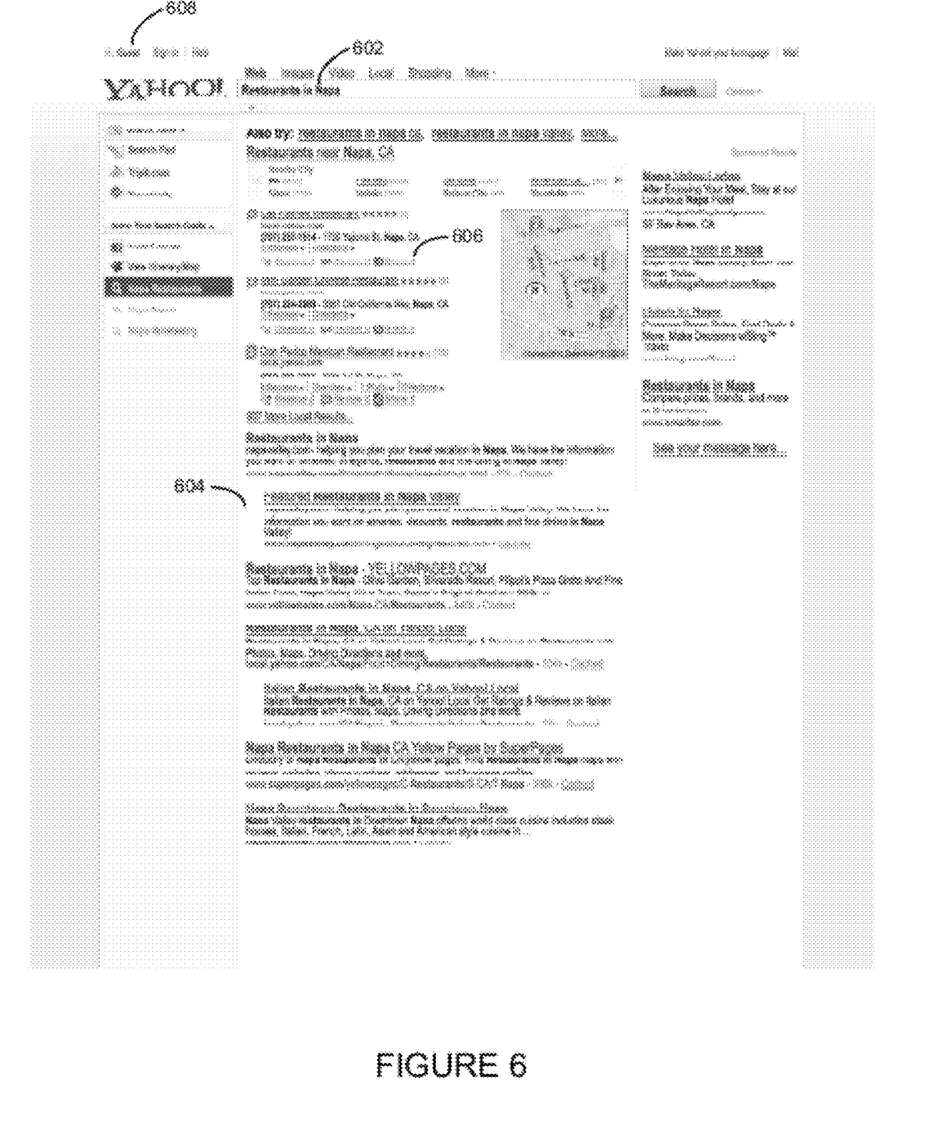
FIG. 6 presents a screen diagram illustrating contextual applications on a search results page according to one embodiment of the present invention.

After ranking the applications, the method 200 displays the applications along with the desired search results, step 212. The method 200 may display the applications with search results in varying forms. In one embodiment, the method 200 displays the application alongside the search results as illustrated in FIGS. 4 and 5. In another embodiment, the method 200 displays the application as a hyperlink underneath the search results as illustrated in FIG. 6.

Figure 3:
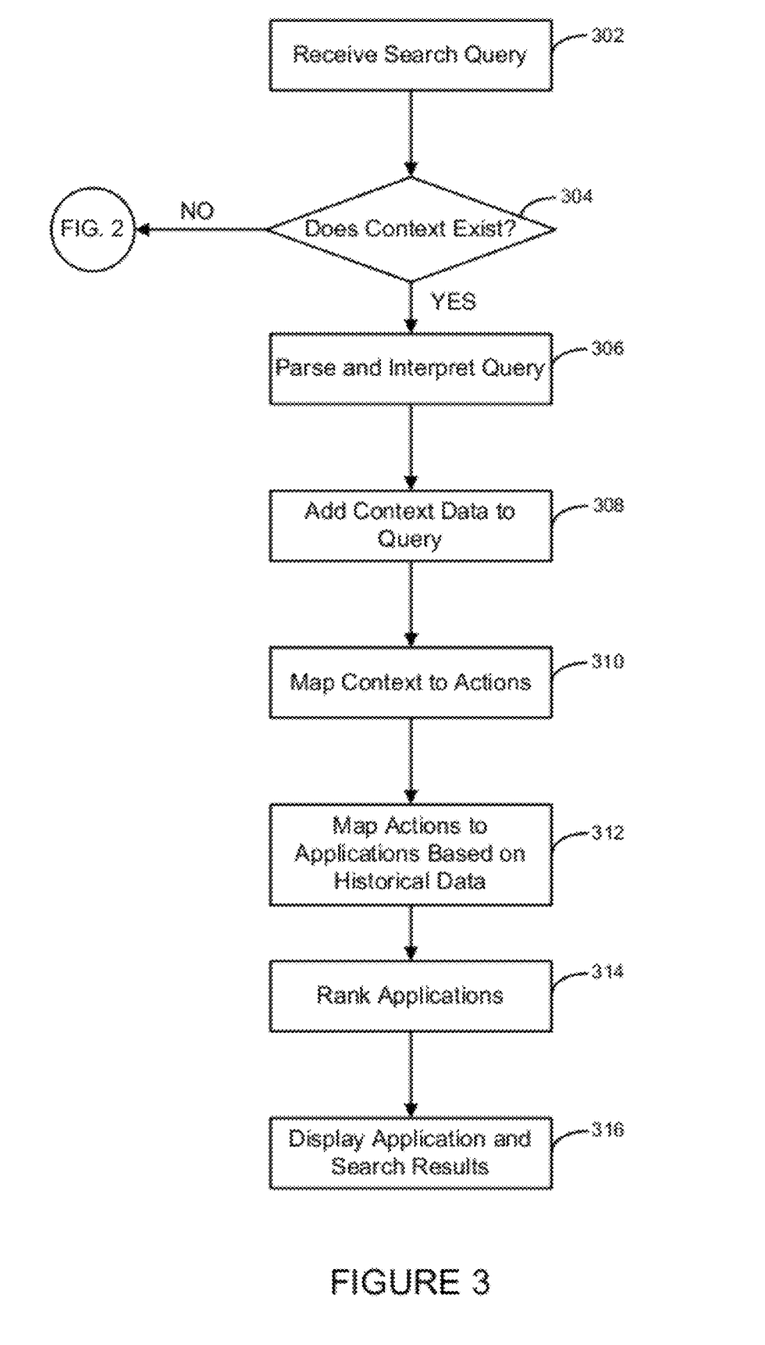
FIG. 3 presents a flow diagram illustrating a method for generating contextual actions based on user context according to one embodiment of the present invention.

FIG. 3 presents a flow diagram illustrating a method for generating contextual actions based on user context according to one embodiment of the present invention. As the embodiment of FIG. 3 illustrates, a method 300 first receives a search query, step 302. In the illustrated embodiment, the method 300 may receive the query via a search form such as an HTML form or other entry mechanism such as a browser toolbar. Expanding on the previous example, the method 300 may receive a query as a plaintext string such as "flight bos to lax."

After receiving a search query, the method 300 determines if user context exists, step 304. In one embodiment, determining if user context exists entails determining whether a user profile or similar structure can be associated with the querying user. Additionally, determining if context exists may entail determining if there are additional, historical queries associated with a given user. In one embodiment, contextual data may be stored by a search engine. In an alternative embodiment, contextual data may be stored on the client device in the form of a cookie or similar mechanism. If the method 300 determines that user context cannot be found, the method 300 proceeds based on the query as described with respect to FIG. 2.

If, however, the method 300 determines that context does determine that context exists, the method 300 first parses and interprets the query, step 306. Parsing and interpreting the query is similar in nature to the method described with respect to FIG. 2 and will not be repeated for the sake of clarity. After parsing and interpreting the query, the method 300 adds contextual data to the query, step 308.

Continuing the example in FIG. 2, the method 300 may first generate an interpretation of "<token:flight><city:boston><token:to><city:los angeles>" for the query "flights bos to lax." After generating such an interpretation, the method 300 adds contextual data such as various characteristics of the user as well as past queries. For example, by utilizing a user profile, or extrapolating a user's trends, the method 300 may add various aspects of the user's personality to the query such as that the user is geographically located in Boston, often visits AMERICAN AIRLINES' website, prefers ORBITZ to TRAVELOCITY, and views restaurant webpages frequently. These examples of user behavior may be based on a user profile, historical user data, or a combination thereof. Additionally, the method 300 may utilize past queries to tailor the identified actions. For example, the method 300 may identify a user has recently searched for "tourist activities los angeles" or "hotels los angeles" and may thus select actions relating to tourism activities despite the instant search being directed towards plane tickets.

After adding the context to the interpreted user query, the method 300 maps the context to actions, step 310. In the illustrated embodiment, mapping context to actions may be performed in a manner similar to that described with respect to FIG. 2. However, the method 300 may utilize the user's context in addition to simply using the user query. For example, the method 300 may return only a "Purchase plane tickets" action and may ignore a "Check flight arrival/departure times" action given that the user has recently search for tourist activities in Los Angeles as the method 300 may make the inference that the user is interesting in travelling, not monitoring another's travels. As another example, the method 300 may return a "Rent a car" action and/or a "Check weather in destination city" action based on the user's search for tourist activities. As yet another example, the method 300 may return a "find a restaurant in destination city" action based on a combination of the user's interest in tourist activities and the user's frequent visits to restaurant websites.

In an alternative embodiment, the method 300 may chain applications wherein subsequent applications are "chained" based on user interaction with a first application. For example, the method 300 may determine that a user first interacts with a restaurant application and may subsequently chain additional applications, such as a movie application, based on the first application interactions. In this embodiment, the method 300 chains applications based on a perceived goal, e.g., a "night out" goal combining a restaurant application and a movie application. In one embodiment, chained applications may be provided asynchronously to a user. For example, a search results page may display only one application (e.g., a restaurant application), and if the user interacts with the application, the method 300 may update the search results page to include a second, chained application (e.g., a movie application). Conversely, if the user does not interact with the restaurant application, the search results page remains unchanged.

After determining a plurality of actions, the method 300 maps actions to applications based on historical data, step 312, and ranks said actions, step 314. In the illustrated embodiment, mapping actions to applications based on historical data may be performed in a manner similar to that described with respect to FIG. 2. However, the method 300 may return applications having higher relevancy to an individual user based on their context, preferences, and historical queries. In one embodiment, the method 300 may organize relevant applications into a hierarchy of applications. Continuing the above examples, the method 300 may select a plurality of applications relating to purchasing plane tickets (e.g., an ORBITZ, TRAVELOCITY, and EXPEDIA application). The method 300 may further indicate that these applications are of the highest priority and the method 300 should place these applications within the highest priority level. However, utilizing the contextual information that a user uses ORBITZ more often than TRAVELOCITY the method 300 may rank the applications such that ORBITZ is the highest priority application within this priority level. The method 300 may determine as many priority levels as necessary. For example, the method 300 may further create a second priority level containing tourism activities such as a HERTZ rental car application, a YAHOO WEATHER application, and a YELP restaurant application. As described with respect to FIG. 2, ranking of applications may utilize various metrics such as the application's popularity based on the number of users that utilize the application upon entering a particular type of query. This data may be collected by various user metric collection devices embedded within the application or application container page. In another embodiment, the method 300 may utilize past user searches to identify a given search goal. For example, the method 300 may identify that a user has searched for dinner suggestions as well as movie theatres in a given location. Based on this search pattern, the method 300 may bundle related applications for the search history such as bundling a dining application and a theatre application.

After ranking the applications, the method 300 displays the applications along with the desired search results, step 316. Displaying the applications with search results may be accomplished in varying forms. In one embodiment, the application is displayed alongside the search results as illustrated in FIGS. 4 and 5. In another embodiment, the application may be displayed as a hyperlink underneath the search results as illustrated in FIG. 6.

FIG. 4 presents a screen diagram illustrating contextual applications on a search results page according to one embodiment of the present invention. As the embodiment of FIG. 4 illustrates, a search engine results page is displayed in response to the user query 402 ("flight bos to la"). The search engine results page first displays the search results 404. In addition to the search results, the search engine results page contains an application 406 selected for the querying user. In particular, the search engine results page displays an ORBITZ application returned in response to the user's query for flights from Boston to Los Angeles. Additionally, the application 406 fills in the "From" and "To" fields based on the user query.

FIG. 5 presents a screen diagram illustrating contextual applications on a search results page according to one embodiment of the present invention. As the embodiment of FIG. 5 illustrates, a user enters a search query 502 for "mortgage rates" and receives a plurality of search results 504. The embodiment of FIG. 5 illustrates an application 508 selected without user profile data or historical data and an application 506 selected based on user profile data.

Application 508 is presented to the user based primarily on the query "mortgage rates." As such, the search engine determines that a query for mortgage rate may be associated with an application illustrating average mortgage rates across the country. In contrast, application 506 is presented to a user based on a user profile or similar mechanism. As illustrated, application 506 represents an application that allows a user to search for mortgage rates in their locality. Based on a user profile, the search engine pre-fills the application with a user location, possibly stored in a user profile or similar device. Additionally, the search engine pre-fills the loan amount, loan purpose, and loan type. In one embodiment, the present invention may determine which of the fields to pre-fill based on privacy considerations. In one embodiment, such data may be gleaned from historical user data. For example, the search engine may identify that the user has recently entered the queries "$200,000 refinancing" and "interest-only loan wikipedia" within a hour or two of each other. Based on these queries, the search engine determines that the user is interested in $200,000 refinancing loans that are interest-only and can pre-fill application 506 with this contextual data.

FIG. 6 presents a screen diagram illustrating contextual applications on a search results page according to one embodiment of the present invention. According to the embodiment FIG. 6 illustrates, a user enters a search query 602 for "Restaurants in Napa" and receives a plurality of search results 604. Additionally, the user receives a plurality of application hyperlinks 606. Notably, the application links are presented to a "Guest" user 608. As such, the application links are generated based on the interpretation of the query "Restaurants in Napa." As illustrated, these interpretations correspond to reserving a table, reviewing a restaurant, and sharing a restaurant with others.

FIGS. 1 through 6 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A method implemented on at least one machine, each of which has at least one processor, storage, and a communication platform connected to a network for providing targeted applications within a search result page, the method comprising:

receiving a search query from a user;
   determining, from a plurality of predefined user actions associated with applications, based on the search query, a user action that the user likely will perform;
   determining, a first application that allows the user to perform the user action;
   determining, a second application, wherein the first application and the second application are independently operable of one another;
   determining, based on context information associated with the user, a parameter that does not include user input provided by the user for the search query;
   providing the first application with the parameter for display on a search result page to enable the user to perform the user action via the first application, wherein the parameter is provided as a potential user input for the first application and is displayed on the first application as a user-modifiable input item; and
   providing, upon detecting user interaction of the user with the first application, the second application for display together with the first application on the search result page.

2. The method of claim 1, wherein the first application is provided for display on the search result page such that the user is able to initiate the performance of the user action from the search result page via the first application.

3. The method of claim 1, wherein determining the user action comprises determining, from the plurality of predefined user actions, the user action based on at least one of the context information or other context information associated with the user.

4. The method of claim 3, wherein at least one of the context information or the other context information is based on at least one of profile information associated with the user or historical query information associated with the user.

5. The method of claim 1, further comprising:
determining whether the first application allows the user to perform the user action; and
selecting the first application from a plurality of applications based on a determination that the first application allows the user to perform the user action.

6. The method of claim 5, further comprising:
determining rankings associated with the plurality of applications, wherein the rankings include a first ranking associated with the first application and at least one second ranking associated with at least another one of the plurality of applications,
wherein selecting the first application comprises selecting the first application from the plurality of applications further based on a determination that the first ranking is greater than the at least one second ranking.

7. The method of claim 6, wherein the first ranking is based on usage information that includes information specifying a number of users that used the first application after the first application was displayed to the users.

8. A system for providing targeted applications within a search result page, the system comprising:
at least one processor programmed to execute one or more one or more computer program instructions which, when executed, cause the at least one processor to:
receive a search query from a user;
determine, from a plurality of predefined user actions associated with applications, based on the search query, a user action that the user likely will perform;
determine a first application that allows the user to perform the user action;
determine a second application, wherein the first application and the second application are independently operable of one another;
determine, based on context information associated with the user, a parameter that does not include user input provided by the user for the search query;
provide the first application with the parameter for display on a search result page to enable the user to perform the user action via the first application, wherein the parameter is provided as a potential user input for the first application and is displayed on the first application as a user-modifiable input item; and
provide, upon detecting user interaction of the user with the first application, the second application for display together with the first application on the search result page.

9. The system of claim 8, wherein the first application is provided for display on the search result page such that the user is able to initiate the performance of the user action from the search result page via the first application.

10. The system of claim 8, wherein determining the user action comprises determining, from the plurality of predefined user actions, the user action based on at least one of the context information or other context information associated with the user.

11. The system of claim 10, wherein at least one of the context information or the other context information is based on at least one of profile information associated with the user or historical query information associated with the user.

12. The system of claim 8, wherein the at least one processor is further caused to:
determine whether the first application allows the user to perform the user action; and
select the first application from a plurality of applications based on a determination that the first application allows the user to perform the user action.

13. The system of claim 12, wherein the at least one processor is further caused to:
determine rankings associated with the plurality of applications, wherein the rankings include a first ranking associated with the first application and at least one second ranking associated with at least another one of the plurality of applications,
wherein selecting the first application comprises selecting the first application from the plurality of applications further based on a determination that the first ranking is greater than the at least one second ranking.

14. The system of claim 13, wherein the first ranking is based on usage information that includes information specifying a number of users that used the first application after the first application was displayed to the users.

15. A machine-readable tangible and non-transitory medium having information recorded thereon for providing targeted applications within a search result page, wherein the information, when read by the machine, causes the machine to perform the following:
receiving a search query from a user;
determining, from a plurality of predefined user actions associated with applications, based on the search query, a user action that the user likely will perform;
determining a first application that allows the user to perform the user action;
determining a second application, wherein the first application and the second application are independently operable of one another;
determining, based on context information associated with the user, a parameter that does not include user input provided by the user for the search query;
providing the first application with the parameter for display on a search result page to enable the user to perform the user action via the first application, wherein the parameter is provided as a potential user input for the first application and is displayed on the first application as a user-modifiable input item; and
providing, upon detecting user interaction of the user with the first application, the second application for display together with the first application on the search result page.

16. The medium of claim 15, wherein determining the user action comprises determining, from the plurality of predefined user actions, the user action based on at least one of the context information or other context information associated with the user.

* * * * *